United States Patent [19]
Garwood et al.

[11] Patent Number: 5,922,388
[45] Date of Patent: *Jul. 13, 1999

[54] PROCESS OF MODIFYING TEXTURE OF FOOD PRODUCTS

[75] Inventors: Robert Eugene Garwood, Bellefontaine; Zenon Ioannis Mandralis; Keith Roberts, both of Dublin, all of Ohio

[73] Assignee: Nestec S.A., Vevey, Switzerland

[ * ] Notice: This patent is subject to a terminal disclaimer.

[21] Appl. No.: 09/136,014

[22] Filed: Aug. 19, 1998

Related U.S. Application Data

[63] Continuation of application No. 08/586,515, Jan. 12, 1996, Pat. No. 5,866,189.

[51] Int. Cl.$^6$ ............................................ A23L 1/05
[52] U.S. Cl. ..................... 426/573; 426/574; 426/575; 426/576; 426/577; 426/660
[58] Field of Search ................... 426/276, 279, 426/281, 573, 574, 575, 576, 577, 578, 579, 549, 660

[56] References Cited

U.S. PATENT DOCUMENTS

| | | | |
|---|---|---|---|
| 3,883,672 | 5/1975 | Bone et al. | 426/72 |
| 4,248,895 | 2/1981 | Stroz | 426/3 |
| 4,444,799 | 4/1984 | Vanderveer et al. | 426/549 |
| 4,624,856 | 11/1986 | Vanderveer et al. | 426/573 |
| 4,781,932 | 11/1988 | Skarra et al. | 426/138 |
| 4,904,493 | 2/1990 | Petrizzelli | 426/549 |
| 4,950,490 | 8/1990 | Ghiasi et al. | 426/138 |
| 5,154,938 | 10/1992 | Broderick et al. | 426/5 |
| 5,364,643 | 11/1994 | Morimoto et al. | 426/102 |
| 5,445,843 | 8/1995 | Beckett | 426/548 |
| 5,455,059 | 10/1995 | McFeaters | 426/578 |
| 5,494,685 | 2/1996 | Tyrpin et al. | 426/5 |
| 5,523,110 | 6/1996 | Mandralis et al. | 426/660 |
| 5,527,556 | 6/1996 | Frippiat et al. | 426/573 |
| 5,545,415 | 8/1996 | Tyrpin et al. | 426/658 |
| 5,576,036 | 11/1996 | Pescheck et al. | 426/94 |

FOREIGN PATENT DOCUMENTS

| | | |
|---|---|---|
| 30863/89 | 9/1989 | Australia . |
| 1312769 | 1/1993 | Canada . |
| 2127963 | 2/1995 | Canada . |
| 0 298 922 | 1/1989 | European Pat. Off. . |
| 0 637 420 | 2/1995 | European Pat. Off. . |
| 0 688 506 | 12/1995 | European Pat. Off. . |
| 2 627 955 | 9/1989 | France . |
| 93/06737 | 4/1993 | WIPO . |

*Primary Examiner*—Carolyn Paden
*Attorney, Agent, or Firm*—Pennie & Edmonds LLP

[57] ABSTRACT

A process for controlling the softness of a food product which tends to lose water and become progressively harder during storage which comprises adding an immobilized edible plasticizer to the food product.

11 Claims, 2 Drawing Sheets

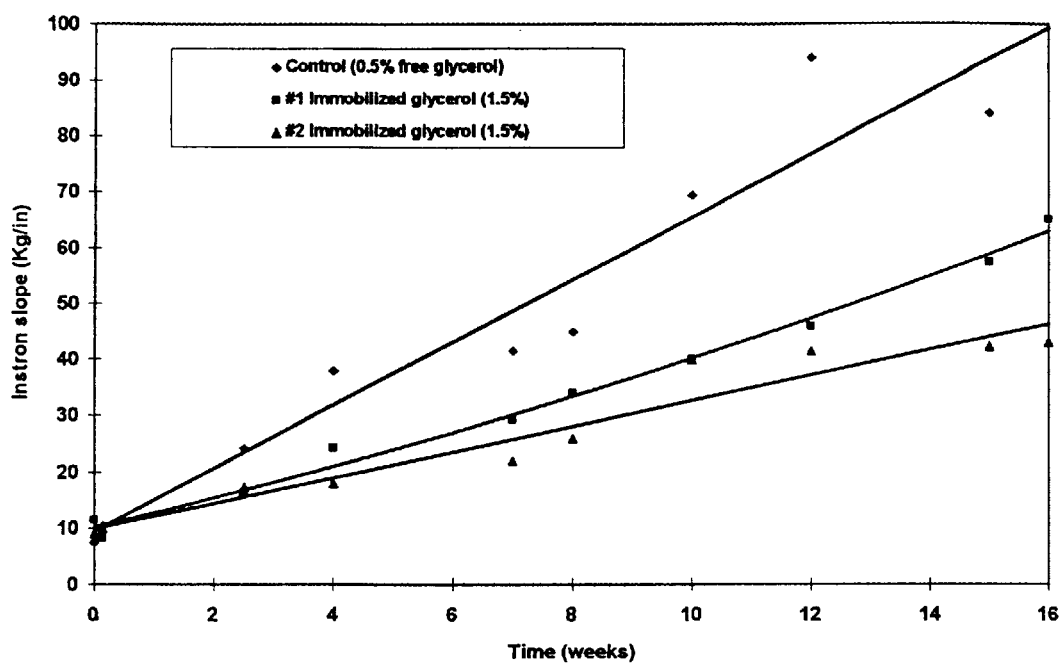
Fifure 1. Comparison of fudge hardness development during storage (as measured by Instron) at various levels of addition of free or immobilized glycerol

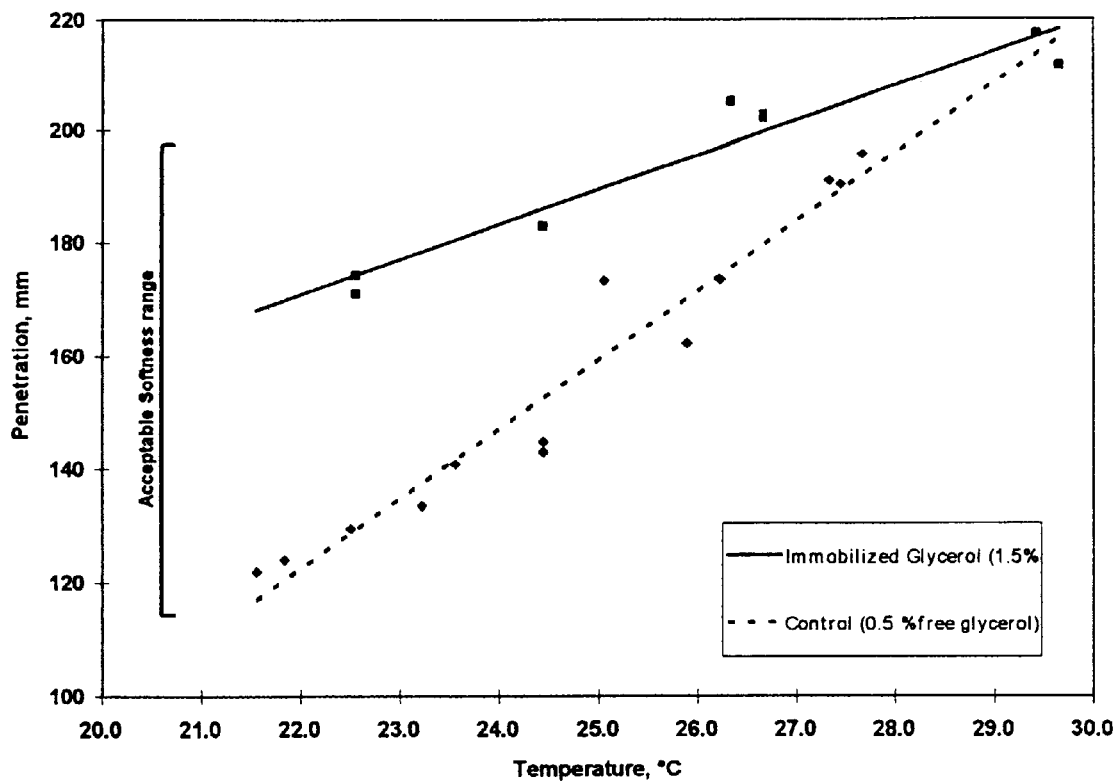
Figure 2. Comparison of hardness of fudge (post-extrusion, measured by penetrometer) between standard fudge and fudge with addition of 1.5% immobilized glycerol

PROCESS OF MODIFYING TEXTURE OF FOOD PRODUCTS

This is a continuation of application Ser. No. 08/586,515, filed Jan. 12, 1996, now U.S. Pat. No. 5,866,189.

TECHNICAL FIELD

The present invention relates to a process for controlling softness of food products, particularly for food products which tend to lose water during storage.

BACKGROUND ART

Water is a commonly used food plasticizer, which to a great extent determines the texture and softness of various food products. However, water is easily lost to the environment either by evaporation or by migration from areas of high water activity to areas of low water activity within the food product during storage of the product. The result of such evaporation or migration of water is that the texture, appearance or flavour of the food product may be altered during storage. In order to overcome this problem, other plasticizers such as polyols are commonly used. These plasticizers are advantageous to use because they do not easily migrate between areas of high and low water activity, they do not support microbial growth and they do not evaporate in the environment during prolonged storage periods. The longer the desired shelf life of the food product, the higher the amount of plasticizer that needs to be added to counteract the hardening of the food product due to water loss.

In several cases, however, the maximum amount of plasticizer added to the food product is limited by processing requirements. For example, in cases of food products which are deposited, molded or extruded, the process requires that the food product is hard enough to maintain its shape during forming and subsequent processing. This is particularly the case with various "composite" food products which consist of various layers or regions of varying composition, texture, and water activity such as filled cereals and baked products, breakfast and nutritional bars, or confectionery products, etc.

SUMMARY OF THE INVENTION

We have found that by first immobilizing the plasticizer and then adding it to such a food product, the two conflicting requirements described above are both satisfied, i.e. more plasticizer may be added for prolonging product shelf life and the shape and texture of the food product may be retained during processing. Immobilization of the plasticizer can be achieved by any well known technique such as gelation of the plasticizer or encapsulation in a suitable wall material using a variety of encapsulation techniques. During production of the food product, the gelled, encapsulated or otherwise immobilized plasticizer is sufficiently retained within the gel, capsule or other matrix so that no or very little plasticization of the food product occurs. During storage of the food product, the gelled, encapsulated or otherwise immobilized plasticizer slowly diffuses out of the immobilizing matrix and into the food product thus imparting to the food product the desired softness or other plasticization effect.

According to the present invention there is provided a process for controlling the softness of a food product which tends to lose water and become progressively harder during storage which comprises adding an immobilized edible plasticizer to the food product.

The food product may be the sole component or one component of a multi-component food product.

The food product may include systems where polyol or polyol/water mixtures are sometimes used in order to plasticize the food system but which cause processing problems such as deformation of the food product, stickiness, sliminess, etc. Examples of such products are centre filled cereal and bakery products which contain regions of different water activity or a confectionery product such as grained product consisting of a mixture of some or all of the following substances: sucrose, invert sugar, corn syrup, molasses, vegetable fat, sorbitol, salt and dairy ingredients. Advantageously, the food component may be pumpable or extrudable, e.g. when the component is a grained product such as fudge, it may be extruded into a rope which may be divided into portions to be used as the centre of a product such as candy bar which is coated with components both hydrophilic and hydrophobic in nature.

BRIEF DESCRIPTION OF THE DRAWINGS

FIG. 1 shows the effect of glycerol on the rate of hardening of fudge during storage, as measured by Instron.

FIG. 2 shows the effect of glycerol on the hardness of fudge, as measured by a Penetrometer, at varying temperatures.

DETAILED DESCRIPTION OF THE PREFERRED EMBODIMENTS

By "immobilized plasticizer" in this invention we mean a plasticizer in a form from which the plasticizer is gradually released into the food product, e.g. over a period of from a few minutes to several months, e.g. from 5 minutes to 18 months, and preferably from 10 minutes to 12 months. Preferably, the immobilized plasticizer should not be released until processing has been completed, e.g. a delay of from 5 minutes to 7 days. Immobilization of the plasticizer can be achieved by any well known technique such as gelation of the plasticizer or encapsulation in a suitable wall material such as an edible lipid using a variety of encapsulation techniques. The rate of release of the plasticizer into the food product can be controlled by the method of immobilization (gelation or encapsulation), the amount and type of gelling agent used, the method of gel preparation (temperature, shear rate) or the type of wall materials used for encapsulation (lipid melting point, protein), and the degree of crosslinking.

The amount of plasticizer in the food product may be from 0.1 to 15%, preferably from 0.5 to 10%, more preferably from 0.75 to 5% and most preferably from 1 to 2% by weight based on the total weight of the food product. If desired, a mixture of plasticizers may be used.

The plasticizer is preferably a liquid and may be a straight or branched chain hydrocarbon based compound containing at least two hydroxyl groups on the carbon skeleton, or it may be water. For example, the plasticizer may be a polyol such as a dihydric alcohol or glycol, a trihydric alcohol or glycol such as glycerol, sorbitol, propylene glycol or water or any combination thereof.

We will now describe various methods of immobilising the plasticizer in more detail.

a) Gelation

For gelation of a plasticizer or a plasticizer/water mixture with a gelling agent, examples of suitable gelling agents are agarose, pectin, xanthan gum, agar agar, kappa-carrageenan, sodium alginate and iota-carrageenan. Other suitable gelling agents such as polysaccharides, e.g. glucomannan, may readily be selected by those skilled in the art. The gelling agents may be used individually or in any combination provided a suitably firm gel is formed with the plasticizer or the plasticizer/water mixture.

The plasticizer which is used for gelation is preferably a liquid and may be straight or branched chain hydrocarbon based compound containing at least two hydroxyl groups on the carbon skeleton. For example, the plasticizer may be a polyol such as a dihydric alcohol, a trihydric alcohol such as glycerol, mannitol, sorbitol, propylene glycol or water or any combination thereof.

The plasticizer which is used for gelation may be a dry plasticizer containing no or substantially no water, for instance, less than 2%. The plasticizer/water mixture which is gelled may be a mixture containing up to 95% by weight of water, for example, from 5 to 85% and, if desired, from 10 to 50% by weight of water.

The gelation of the plasticizer may be carried out by a variety of gelation techniques depending on the gelling agent used. For example, ionic gelation is preferred when sodium alginate is the gelling agent. Thermal gelation is preferred in some cases, because it does not require the addition of substances other than the gelling agent.

Thermal gelation may be carried out, for instance, by slowly adding the gelling agent to the plasticizer with agitation below the gelling temperature to form a dispersion, raising the temperature to above the dissolution temperature while maintaining the agitation and then cooling to below the gelling temperature. For example, when the plasticizer is glycerol and the gelling agent is carrageenan, gelling occurs between 80° and 50° C., the temperature is raised to above the dissolution temperature, e.g. from 90–170° C. and then cooled to below the gelling temperature e.g. ambient temperature. Other ranges would apply to different plasticizer/gelling agent systems which may easily be determined by experimentation or are already known to those skilled in the art.

The amount of gelling agent used to form the gel may be from 0.5 to 15%, preferably from 1 to 7% and especially from 1.5 to 5% by weight based on the weight of the plasticiser.

If desired, a gum such as locust bean gum or gum arabic may be incorporated in the plasticiser gel product in which it may decrease syneresis and increase the break strength and resilience of the gel. Advantageously, the gum may be dispersed in the cold solution of the gelling agent in the polyol before gelation. The amount of gum may be up to 10%, preferably from 0.5 to 5% and especially from 1 to 3% by weight based on the weight of the polyol. The gum may conveniently be incorporated by dispersing in the cold dry plasticiser, increasing the temperature to dissolve the gum e.g. from 100° to 130° C. and cooling back to room temperature after which the gelling agent may be added to form the gel, e.g. according to the procedure described above. Other suitable gums will be readily determined by those skilled in the art.

Advantageously, certain food-grade alkali metal or alkaline earth metal salts, or casein may be added to the solution of the gelling agent in the plasticiser before gelation to alter the characteristics of the resultant gel. The alkali metal or alkaline earth metal salt may be for instance a sodium or calcium salt but is preferably less than 1% by weight based on the weight of the plasticiser since amounts substantially greater than 1% may prevent gelation. The amount of casein e.g. as a potassium salt, may vary more widely e.g. up to 20%, e.g. from 3 to 15% by weight based on the weight of plasticiser according to choice. The addition of one or more of the above ingredients may contribute to the overall strength of the gel and this is particularly advantageous when the amount of gelling agent is low e.g. from 0.5 to 1.5% by weight.

The plasticiser gel should preferably disperse uniformly into the component of the confectionery material and this is achieved by forming the gel into particles, especially beads or thin strands or ropes.

One method of forming a particulated plasticiser gel involves freezing the prepared plasticiser gel e.g. to a temperature of from about −170° C. to −200° C. and then grinding in a cold grinder. The mean diameter of the particles or beads may be from 1 to 1000 microns, preferably from 20 to 400 microns and especially from 100 to 300 microns. Advantageously, an anti-caking agent such as cocoa powder, starch or other food-acceptable anti-caking agent may be added to the particulate cold plasticiser gel and the mixture heated to room temperature whereupon it turns into a free flowing powder since the anti-caking agent prevents the gel beads from agglomerating. During the addition of the anti-caking agent to the plasticiser gel care should be taken to prevent moisture from the environment being drawn into the mixture. The amount of plasticiser gel in the mixture is preferably from 10 to 80% by weight, and especially from 40 to 70% by weight.

A second method of forming a particulated plasticiser gel comprises adding a plasticiser solution, preferably at room temperature, containing a dispersed gelling agent to an edible lipid which is maintained above its melting point, heating to dissolve the gelling agent, preferably with agitation e.g. stirring, to disperse the plasticiser droplets (containing gelling agent) throughout the lipid phase to form an emulsion. In the case of glycerol gelled with carrageenan, the edible lipid may be heated to a temperature from 90° to 170° C. to dissolve the carrageenan. The droplet size may be reduced by increased agitation and for particle sizes below about 100 microns, a homogeniser may be used. If desired, an emulsifier such as lecithin may be added. After the required droplet size is obtained, the mixture may be allowed to cool, e.g. to a temperature slightly higher than the melting point of the edible lipid, while continuing the agitation to maintain the droplets uniformly dispersed in the lipid matrix. When the temperature falls below the gelling point (which temperature is characteristic of each plasticizer/gelling agent system and can be determined by experimentation), the droplets turn into gel beads. At this point stirring may be discontinued and the gel beads may be separated from all or part of the the lipid phase by decantation, centrifugation, filtration, etc. The gel beads may be used immediately or may be stored. During storage of the gel beads, the remaining lipid phase may solidify if the temperature is kept below the melting point of the lipid. The solid lipid phase contains the gel beads and prevents their coalescence.

b) Encapsulation of Plasticizers in Encapsulating Agents

The plasticizer or mixture of plasticizers and water may be immobilized by encapsulating them into a thin coating or a matrix of edible lipids or proteins by any techniques well known to those skilled in the art of encapsulation (e.g. double emulsions, spray congealing, centrifugal extrusion, etc.) In this invention, the encapsulated particles may be micro- or macro-capsules having an average diameter of from 1 to 1000 microns, preferably from 20 to 400 and especially from 100 to 300 microns and the coating is an edible lipid.

The amount of plasticizer in the capsule may be from 1 to 95% by weight, preferably from 30% to 70% by weight and especially from 40 to 60% by weight based on the total weight of the capsule.

The plasticizer is preferably a liquid and may be a straight or branched chain hydrocarbon based compound containing at least two hydroxyl groups on the carbon skeleton. For example, the plasticizer may be a polyol such as a dihydric alcohol or glycol, a trihydric alcohol or glycol such as glycerol, sorbitol, or propylene glycol or any combination thereof.

The plasticizer may be encapsulated within the edible lipid phase by any conventional encapsulation process such as, e.g. double emulsification, spray congealing, centrifugal extrusion, etc. One advantageous process involves mixing a lipid in liquid form with the plasticizer to form an emulsion, optionally in the presence of an emulsifier from 60° to 90° C. and homogenising the emulsion under pressure e.g. from $2 \times 10^6$ to $1 \times 10^7$ Pa at a temperature from 60° to 90° C. followed by spray cooling, for instance, in a spray cool tower.

The edible lipid used in the preparation of the gel or of the encapsulated product is preferably a fat similar to the fat contained in the component with which the encapsulated product is mixed or to a fat contained in any of the other components of the final food product e.g. hydrogenated soya bean oil, peanut butter, cocoa butter or equivalent thereof, palm kernel fat or other suitable hydrogenated vegetable oils or waxes. The protein used in the preparation of the encapsulated product is preferably egg albumin, casein, whey, soy or gelatin. The usual method of encapsulation would be to form a solution of the protein into water or polyol and heat the solution in order to denature the protein and form a "gel" material similar to the gels we create in the description above.

The immobilised plasticizer may be added to the food component at any suitable stage, e.g. in the case of an extruded grained product such as fudge, before the extrusion step as long as the immobilized plasticizer is not subjected to extreme temperatures and/or shear which would result in melting of the immobilizing fat matrix or in breaking down of the immobilizing gel matrix and release of the plasticizer during subsequent processing such as molding into the desired shape, or depositing a coating. The immobilised plasticizer is preferably distributed substantially uniformly throughout the food component which latter component forms the continuous phase.

Any suitable gentle blending procedure may be used for mixing the immobilised plasticizer in particulate form with the food component but particular care must be exercised so that there is not excessive shear applied which could rupture the gel matrix or there is not excessive heat development which could melt the gel or the lipid matrix and release the plasticizer.

The food component, after addition of the immobilised plasticizer, may be used alone as a food product, or it may be mixed with, added to, layered with, or coated with the other components of the final confectionery product.

EXAMPLES

The following Examples further illustrate the present invention. Parts and percentages are given by weight.

Example 1 a. 15 parts of carrageenan (Gelcarin DG654B provided by FMC Corporation, PA) is thoroughly mixed in 500 parts of dry glycerol at room temperature by using a high shear mixer.

b. 5000 parts of hydrogenated soya bean oil (used in the fudge) containing 0.5% Yelkin TS (from ADM) as an emulsifier is heated in a stirred tank to 140° F.

c. Under continuous stirring, the suspension produced in step (a) is introduced in the oil phase described in step (b), and the speed of the mixer is fixed at 500 rpm, which produces a dispersion of glycerin droplets in the oil phase with the desired particle size.

d. Under continuous stirring, the temperature of the system is slowly brought up to 300° F. As soon as this temperature is reached, the heat input is discontinued and the system is allowed to cool down to about 110° F. while stirring is continued.

e. When the temperature reaches 110° F., stirring is stopped and the system is allowed to decant. In less than 5 minutes, two distinct phases, the one rich in oil and the other rich in glycerol gel beads is formed.

f. By decantation, the gel bead rich phase is separated from the oil phase. The gel bead phase comprises from 70% glycerol beads and 30% oil and the glycerol content is 67.9% by weight.

The gel rich phase can be stored at room temperature, in which case the molten fat solidifies or it can be stored at about 110° F. so that the fat remains in the liquid state. In the first case, the system has to be brought up to 110° F. for several hours before it can be used (for the trial described later, the gel beads were heated for about 12 hours before use).

5270 parts of a fudge mass comprising a mixture of sucrose, invert sugar, corn syrup, molasses, vegetable fat, sorbitol, salt and dairy ingredients is prepared and the mixture is added to a water jacketed Buss mixer held at a constant temperature. The mixture is allowed to cool to about 150° F. before the mixer is turned on. The temperature of the mixture continues to drop until crystallisation occurs around 137° F., at which point a slight increase of the temperature is observed to about 140° F. Mixing continues for ten minutes, during which the temperature is continuously falling.

At the last stage of mixing (after the temperature exhibits the rise associated with crystallisation) the glycerol gel beads are added. The total amount added is 119 parts of gel beads and hydrogenated soya bean oil, which contains 80.8 parts glycerol, resulting in a final product containing 1.5% glycerol in its immobilized form.

To illustrate that the rate of hardening of the fudge is considerably retarded by the addition of the glycerol beads, a comparison (control) fudge is prepared by a similar process from a similar fudge mass containing 0.5% free glycerol, except that no glycerol beads are added at the last stage. At the time of preparation, both samples have approximately the same hardness. When the samples are stored under conditions that simulate the environment in the actual product, the control fudge (0.5% w/w free glycerol) gets progressively harder than the sample prepared with 1.5% w/w immobilized glycerol as judged by Instron measurement. This provides evidence that addition of glycerol gel beads helps to maintain softer fudge by gradually releasing glycerol and plasticizing the fudge mass. This is illustrated in the attached FIG. 1.

This provides evidence that addition of glycerol beads helps to maintain softer fudge by gradually releasing glycerol and plasticizing the fudge mass. It is also evidence that the immobilized glycerol is, at least partially, released over time and exhibits the same plasticization properties as those of free glycerol.

Example 2

In a further test, two fudge mass batches were extruded. A control fudge (0.5% w/w free glycerol) was monitored for hardness, temperature, and width of the extruded rope after the extrusion step in order to establish a range of "softness" that does not cause problems in downstream processing. Another batch of fudge was prepared without any free glycerol and it was processed in the same way. The only difference was that 1.5% by weight immobilized glycerol (in the form of gel beads prepared as described in Example 1) was added to the fudge during the sugar crystallization period. During this period, the fudge is slowly mixed for about 20 to 30 minutes while its temperature is slowly reduced from about 150° F. to about 70° F. The hardness of the samples was measured by a Penetrometer which measures the depth of penetration of a metal cone into the sample for a constant period of time (20 sec). The softer the sample the higher the penetration depth recorded. The results are shown in FIG. 2. Addition of the immobilized glycerol (at 1.5% w/w) caused the extruded fudge to be slightly softer than the control. However, its softness was still in the acceptable range. In addition, the fudge kept its texture and form as evidenced by the width of the extruded rope that did not change significantly. Also, during downstream processing, of cutting the extruded fudge rope, caramel coating, peanut coating, and chocolate enrobing the usual problems associated with "soft", "sticky", "slimy", or "deformed" fudge did not occur.

An Instron hardness test was conducted 5 days after production of the samples. The Instron instrument recorded force (in Kg) required to penetrate 0.25" and 0.5" into the sample. The results are given in the following table:

| Penetration | Control (0.5% glycerol) Force Kg | Immobilized Glycerol (1.5%) Force Kg |
|---|---|---|
| 0.25" | 13.1 | 6.8 |
| 0.50" | 28.4 | 15.7 |

These results indicate that the immobilized glycerol has already been, at least partially, released and softened the fudge.

A taste test was conducted when the sample was 2 weeks, 3 months, 5 months and 8 months old. The sample with 1.5% w/w immobilized glycerol was always judged to be significantly softer than the control (containing 0.5% free glycerol).

Comparative Example 1.5% w/w free glycerol was added to a fudge mass prepared without any free glycerol. The extruded fudge caused many problems during downstream processing due to the very soft, sticky, and deformed fudge rope.

What is claimed is:

1. A process for controlling the softness of a food product which tends to lose water and which thereby becomes progressively harder during storage, which comprises immobilizing an edible plasticizer by encapsulation in an edible lipid or protein and adding the immobilized encapsulated edible plasticizer to the food product in an amount sufficient to retard the hardening of the food product due to said water loss over time and under conditions which avoid melting or breakdown of the immobilized encapsulated edible plasticizer, such that said plasticizer is gradually released during storage of said food product to compensate for said water loss.

2. A process according to claim 1 wherein the food product is the sole component or is one component of a multi-component food product.

3. A process according to claim 1 wherein the food product is a center filled cereal or bakery product, nutritional bar, breakfast bar, confectionery bar containing regions of different water activity or a grained product.

4. A process according to claim 1 wherein the food product is pumpable or extrudable.

5. A process according to claim 1 wherein the food product is a grained product extruded into a rope which is divided into portions.

6. A process according to claim 1 wherein when the plasticizer is a liquid straight or branched chain hydrocarbon based compound containing at least two hydroxyl groups on the carbon skeleton.

7. A process according to claim 1 wherein the plasticizer is glycerol, sorbitol or propylene glycol.

8. A process according to claim 1 wherein the amount of plasticizer in the food product is from 0.1 to 15% by weight based on the total weight of the food product.

9. A process according to claim 1 wherein immobilization of the plasticizer is achieved by encapsulation in an edible protein.

10. A process according to claim 1 wherein the edible lipid is hydrogenated soya bean oil, peanut butter, cocoa butter or equivalent thereof, palm kernel fat or other suitable hydrogenated vegetable oils or waxes.

11. A process according to claim 1 wherein the food product is coated with components that are both hydrophilic and hydrophobic in nature.

* * * * *